United States Patent [19]

Garwin

[11] Patent Number: 4,525,186
[45] Date of Patent: * Jun. 25, 1985

[54] METHOD FOR PRODUCING ISOTOPICALLY ENRICHED HELIUM-4 AND USE OF SAME AS NUCLEAR REACTOR COOLANT

[76] Inventor: Leo Garwin, 1512 Camden Way, Oklahoma City, Okla. 73116

[*] Notice: The portion of the term of this patent subsequent to Jul. 18, 1995 has been disclaimed.

[21] Appl. No.: 306,009

[22] Filed: Sep. 28, 1981

Related U.S. Application Data

[63] Continuation-in-part of Ser. No. 925,158, Jul. 17, 1978, Pat. No. 4,304,634, which is a continuation-in-part of Ser. No. 632,218, Nov. 17, 1975, Pat. No. 4,101,375, which is a continuation-in-part of Ser. No. 307,405, Nov. 17, 1972, abandoned.

[51] Int. Cl.$^3$ .................................................. F25J 3/02
[52] U.S. Cl. ........................................... 62/22; 62/40; 423/262
[58] Field of Search ................. 176/92 R, 60; 252/71; 423/262; 62/22, 28, 9, 14, 40

[56] References Cited

U.S. PATENT DOCUMENTS 4,101,375  7/1978  Garwin .................................. 62/22

OTHER PUBLICATIONS

Mezhov–Deglin; "An Apparatus for Producing Pure He$^4$"; Prib i Tekh. Eksper.; No. 3 (1971), pp. 217, [Cryogenics, Aug. 72, pp. 311–312].
Mendelssohn; "Progress in Cryogenics"; Heywood & Co. Ltd.; vol. 1; London; 1959; p. 110.
Keller; "He$^3$ and He$^4$"; Plenum Press; N.Y.; 1969; p. 36.

Primary Examiner—Frank Sever
Attorney, Agent, or Firm—William R. Laney

[57] ABSTRACT

Isotopically enriched helium-4, that is, helium-4 which is low in helium-3, is useful as a nuclear reactor coolant. It is produced from liquefied natural gas source helium by distilling helium-3 therefrom. The coolant is preferably enriched in hydrogen up to about 6 percent by volume to thereby improve the heat transfer characteristics of the coolant, and to reduce the power requirements for circulation of the coolant.

6 Claims, 4 Drawing Figures

METHOD FOR PRODUCING ISOTOPICALLY ENRICHED HELIUM-4 AND USE OF SAME AS NUCLEAR REACTOR COOLANT

RELATED APPLICATIONS

This application is a continuation-in-part of my copending application Ser. No. 925,158, filed July 17, 1978, for "Method for Producing Isotopically Enriched Helium-4 and Use of Same as Nuclear Reactant Coolant", now issued to U.S. Pat. No. 4,304,634 dated Dec. 8, 1981, which application is a continuation-in-part of my copending application Ser. No. 632,218, filed Nov. 17, 1975, for "Isotopically Enriched Helium-4", now U.S. Pat. No. 4,101,375 issued July 18, 1978, which application is a continuation-in-part of my application Ser. No. 307,405, filed Nov. 17, 1972, for "Isotopically Enriched Helium-4", now abandoned.

BACKGROUND OF THE INVENTION

1. Field of the Invention

This invention relates to a method of producing isotopically enriched helium-4 (helium-4, the helium-3 content of which is below that of natural gas source helium) from liquefied natural gas source helium, and to an improved process for cooling a nuclear reactor with helium through the use of isotopically enriched helium-4 as the coolant.

2. Brief Description of the Prior Art

There are two natural sources of helium which have been used for its production, namely, natural gas and air, and there are two naturally occurring helium isotopes, helium-4 and helium-3. The predominant isotope, helium-4, possesses an atomic weight of 4 and comprises all but about one part per million (ppm) or less, on a volume or mol basis, of natural source helium. This isotopic form of helium becomes a superfluid liquid (possesses zero frictional resistance) at temperatures below around 2.2° K. (obeys Bose-Einstein quantum statistics), and as a gas is impervious to radiation and possesses a low cross-section for neutron capture. Helium-3, the lighter isotope, has an atomic weight of 3, is present in natural source helium to the extent of about one ppm or less, does not become superfluid at low temperatures (obeys Fermi-Dirac quantum statistics), and undergoes conversion in a strong radiation field, by absorption of beta particles, to tritium, the heaviest isotope of hydrogen, with a half-life of about $12\frac{1}{4}$ years.

The isotopic ratio of helium-3 to helium-4 in natural source helium is about an order of magnitude higher in helium derived from the air (atmospheric source helium) than in helium derived from natural gas (natural gas source helium). In times past, helium has been extracted on occasions for needed purposes from the air, but today the exclusive economic source of helium is natural gas. In atmospheric source helium the helium-3 content is about 1.2 ppm, relatively independent of location. In natural gas source helium, the helium-3 content varies somewhat, ranging, according to some of the older measurements of Aldrich and Nier (Physical Review, Dec. 1, 1948, p. 1590), from about 0.05 to about 0.5 ppm, depending on the location of the natural gas. These results are imprecise, with an admitted relative error of about 10–30%.

Later and more accurate measurements of helium-3 in natural gas source helium were made using high resolution mass spectrometers. These showed the helium-3 content of samples of natural gas source helium to run between 0.17 and 0.23 ppm, with a measurement precision of about 0.01 ppm, an order of magnitude better than that of the older measurements of Aldrich and Nier. Still more recently, very accurate instrumentation has been developed and used by the United States Bureau of Mines [Report of Investigations 8119 (1976)] to measure the amount of helium-3 in helium-4, the measurement uncertainty being something less than 0.001 ppm, or 1 part per billion (ppb).

Until very recently the helium-3 content of atmospheric source or natural gas source helium was of academic or theoretical interest only. However, in the last few years, with the advent of nuclear power, one of the major nuclear reactor designs which has emerged is that of the high-temperature gas-cooled reactor (HTGR), developed in the United States by General Atomic Company. The HTGR design uses helium gas as the coolant, to abstract heat from the graphite nuclear core, which heat is then converted first into mechanical, and then electrical, energy. The HTGR design development has imparted considerable practical significance to the matter of the helium-3 content of helium, as will hereinafter be discussed.

At the present time, there are two HTGR plants operating in the United States. The earlier one is the Peach Bottom unit of Philadephia Electric Company, a pilot facility of 40 Mw(e), and the more recent one is the 334 Mw(e) Fort St. Vrain reactor of Public Service Company of Colorado. Orders have been placed with General Atomic Company for a half-dozen or so additional plants, in the capacity range 770–1160 Mw(e), with an estimated value of $2–3 billion.

The HTGR possesses a helium coolant inventory averaging about 2.0 million standard cubic feet (MMscf) of helium per 1000 Mw(e). The ratio varies somewhat, ranging from about 2.6 for the smaller reactor sizes in the 350 Mw(e) class to about 1.4 for the largest reactor size of 1150 Mw(e). The helium circulates at an operating pressure of 350–700 psig, at a rate of about one-fourth of its inventory per hour, and there is made up for mechanical and other losses some 10% of the inventory per year.

The advantage of helium over other coolants (except in certain respects, hydrogen) reposes in its low density and high heat capacity, with attendant lower circulating rates and power requirements; its ability to operate without thermal decomposition at very high temperatures (so far, up to 2400° F.), yielding high reactor thermal efficiencies; its chemical inertness (because it is a noble gas) toward any substance or component of the circulating system with which it comes in contact; its stability or imperviousness to radiation—it itself is a product, as an alpha particle, of the process of radioactive disintegration; and its low cross-section for neutron absorption or capture, giving good reactor neutron efficiencies. Further, helium is readily purified to a high degree, so that the impurities normally present in it—nitrogen, neon, water, and hydrogen—are in the very low ppm range.

In some respects, as hereinabove mentioned, helium is not as advantageous a coolant in the HTGR as is hydrogen, for the reason that hydrogen possesses a higher heat capacity, a higher thermal conductivity, a lower viscosity, and a lower density, producing thereby an approximate $\frac{1}{3}$ overall increase in heat transfer rate and a reduction in required pumping power of about $\frac{1}{2}$. Hydrogen does possess some disadvantages, however, in that it cannot be purified as well, is combustible and consequently for safety reasons needs to be kept to less than about 6% by volume in air, tends to dissociate at very high temperatures into atomic hydrogen which diffuses through most steels, and tends also at very high temperatures (apparently beyond those of the current HTGR design) to react slowly with graphite to produce methane, counterbalancing which detrimental methanation effect, however, is its tendency to suppress the corrosion of graphite by an accidental inleak of water from the steam-generator side of the HTGR. On the basis of these considerations, I have determined that there is a mixture of a modest amount of hydrogen in helium which, as a coolant, in overall respects, is superior to helium or hydrogen alone.

Now that some operating experience has been acquired with the helium-cooled HTGR, it has been discovered that the helium-3 content of the helium circulant is a detrimental impurity, in that it undergoes nuclear modification in the high intensity radiation field of the reactor to produce radioactive tritium, which because of its radioactivity level needs to be removed continuously, along with radioactive fission products which from time to time escape from the core of the reactor into the helium coolant. These other radioactive contaminants of the helium coolant, are, in the main, heavy inert gases such as krypton and xenon, and are not too difficult to remove from the helium by the relatively simple purification process of charcoal adsorption. Tritium, on the other hand, a hydrogen isotope, is much lighter than the other radioactive contaminants and is not readily removed by physical adsorption onto charcoal; it must be oxidized and the tritium oxide in turn absorbed, or it must be removed by reaction with porous titanium metal sponge, which sponge must then physically be replaced when exhausted. Since tritium and hydrogen are sister isotopes, any removal of the tritium inevitably brings about the removal of all of the hydrogen also present, and the duty of the purifier is fixed by the sum of the amounts of tritium and hydrogen in the coolant. Thus, the removal of the tritium, however accomplished, poses a significant radioactive solid waste disposal problem, because of its relatively high level of radioactivity and its long half-life, and increases, because of concomitant, although unnecessary, hydrogen removal, the duty of the purifier.

Upon recognition of the problem of helium-3 in helium circulant, operators of the newer HTGR plants have attempted to fill and operate their systems with helium containing the lowest possible amount of helium-3. Since, however, the only helium which has been available for any purpose, including nuclear reactors, is ordinary commercial helium derived from natural gas (natural gas source helium) containing, as earlier described, approximately 0.20 ppm of helium-3, these operators in their recent purchases of helium have specified sources containing helium-3 in the lower 0.17–0.18 ppm range, even though it would be desirable and advantageous for them to use helium containing helium-3 in amounts an order of magnitude below this, which low helium-3 content helium, however, simply does not exist in nature.

It can thus be seen how advantageous it would be to produce and have as an HTGR coolant isotopically enriched helium-4, or helium the helium-3 content of which is significantly lower than that in natural gas source helium, and preferably below about 0.05 ppm, the benefits in HTGR use being related directly to the degree of reduction of the helium-3 content below that of natural gas source helium.

I have discovered that isotopically enriched helium-4, nonexistent in nature, can be produced from liquefied natural gas source helium by distillation therefrom of its helium-3, and when used in place of natural gas source helium as a coolant for a high-temperature, gas-cooled reactor, can bring about an improvement in the form of a more efficient (lower cost) and safer (lower radioactivity level) reactor operation.

The separation of helium-3 and helium-4 is in itself not new in the art, but as heretofore practiced has not produced isotopically enriched helium-4 from natural gas source helium under the conditions of separation of the present invention. The prior art separation methods are the following:

1. The source material is a mixture of 1–3 mol percent helium-3 in helium-4, argon, air, and traces of tritium, derived from U.S. Energy Research and Development Administration (ERDA) operations which produce tritium by nuclear bombardment of lithium-6 isotope, the tritium subsequently decaying to helium-3. The source material is separated for the express purpose of producing therefrom a relatively high purity helium-3, the separation process being one of gaseous thermal diffusion (*Chemical Engineering*, Nov. 25, 1963, p. 64), and carried out at the Mound Laboratory of Monsanto Research Corporation at Miamisburg, Ohio, under contract with ERDA. The products are helium-3 of 99 plus percent purity and residue gas with a helium-3 content of the order of 0.01 percent (100 ppm).

A recent improvement by Mound Laboratory on the enrichment process, using the same source material, is the substitution for thermal diffusion of low temperature distillation under vacuum (pressure 130 mm, overhead column temperature 0.93° K., bottoms temperature 2.80° K.), as described by Wilkes (*Advances in Cryogenic Engineering*, Plenum Press, Vol. 16, (1970), p. 298).

2. Helium-3 enrichment is achieved starting with natural gas source helium. One of the methods reported is that of cryogenic gas centrifugation (Newgard et al., U.S. Pat. No. 3,251,542). Another depends on the superfluid properties of helium-4 below around 2.2° K., which permit it to separate from helium-3 by selective passage through a superleak, the helium-3 being retained (Keller, Helium-3 and Helium-4, Plenum Press, (1969), p. 36). The helium-3 enrichment achieved per pass is of the order of 5 times, with consequent low yields of enriched helium-3 and insignificant denuding of helium-3 in the remaining helium-4. Successive passes of the helium-3 enriched product to improve the helium-3 purity are more difficult and less successful, because the lambda point (the temperature at which superfluidity is achieved) decreases with increasing helium-3 content.

Recent improvements in the superleak separation process have been made by Mezhov-Deglin (*Cryogenics*, August 1972, p. 311, translated from *Pribory i Tekhnique Eksperimenta*, No. 3, 1971, p. 217) and Faturos et al. (*Cryogenics*, March 1975, p. 147), yielding an isotopically enriched helium-4 in the former case of about 0.05 ppm of helium-3, and in the latter case of about 0.0004 ppm of helium-3.

3. Helium-3 enrichment to a high purity helium-3 product is achieved starting with about 0.01% helium-3 in helium-4, the residue gas from the earlier-described thermal diffusion process of Mound Laboratory. The helium-3 enrichment is accomplished by a combination of superleak filtration and vacuum distillation, in that order, in a common apparatus, as disclosed by McKinney et al. (U.S. Pat. No. 3,421,334).

4. The feed material for the separation is about 6 mol percent helium-3 in helium-4. It is the heavier of two immiscible liquid phases in the helium-3, helium-4 dilution refrigerator, used to produce deep refrigeration, in the vicinity of 0.01° K. Essentially pure helium-3 is removed from the feed by evaporation or pumping at about 0.7° K. under very high vacuum to regenerate the helium-3 refrigerant for recirculation.

5. The feed material is atmospheric source helium, and it undergoes a vapor-liquid separation at pressures up to 1 atmosphere (Fairbank et al. *Physical Review*, Vol. 71, pages 911-913, 1947). Fairbank has determined the coexistent vapor-liquid phase equilibria and relative volatilities for helium-3 in helium-4 in this feedstock and in this pressure range. The helium-3/helium-4 relative volatility in the feedstock diminishes from something in excess of 5 near the lambda point to something below 2 in the vicinity of the normal boiling point of helium-4. Fairbank asserts an expectation—unsupported by experimental data—that the relative volatility of this system would become unity at the critical temperature of helium-4, namely 5.2° K., at which point separation by distillation would be deemed impossible. The precise trend, however, of relative volatility from 4.2° K., the normal boiling point of helium-4, to 5.2° K., the critical temperature of helium-4, is unknown, even for Fairbank's atmospheric source helium feedstock, and it certainly is unknown over the entire pressure range for natural gas source helium, with its significantly lower initial helium-3 liquid concentration. It is well recognized that the relative volatility of the components of such a non-ideal system as this one, at these very low temperatures near absolute zero, is uncertain and unpredictable, and is strongly dependent on liquid concentration and system temperature and pressure.

Thus, so far as is known to me, isotopically enriched helium-4 has not heretofore been produced by separating helium-3 by distillation from liquefied natural gas source helium, and has not heretofore been used in a high temperature gas cooled nuclear reactor to improve the performance of the helium coolant in said reactor.

It was an unanticipated finding, therefore, that the separation by distillation of helium-3 from liquefied natural gas source helium to yield isotopically enriched helium-4 could take place at pressures and temperatures ranging from those in the vicinity of the lambda point (40 mm and 2.2° K.) to those near the critical temperature of helium-4 (1700 mm and 5.2° K.), and that said isotopically enriched helium-4, when used as a high-temperature gas-cooled nuclear reactor coolant, enabled a build-up of hydrogen in the coolant, resulting in a more economical, improved and safe nuclear reactor operation.

SUMMARY OF THE INVENTION

It is an object of this invention to provide a method of producing isotopically enriched helium-4, that is, helium-4 with a helium-3 content below that in natural gas source helium, from liquefied natural gas source helium by removing helium-3 therefrom by distillation.

It is a further object of this invention to provide an improved method of cooling an HTGR nuclear reactor by the use therein as a coolant of isotopically enriched helium-4, the improvement comprising lower purification requirements for tritium in the circulating helium, and, through a controlled increase in hydrogen content of the coolant, better heat transfer rates and lower pumping requirements for the coolant.

Other objects, features and advantages of the invention will be apparent from the following detailed description of the invention, read in conjunction with the accompanying drawings.

DETAILED DESCRIPTION OF THE DRAWINGS

DESCRIPTION OF THE PREFERRED EMBODIMENTS

Figure 1:
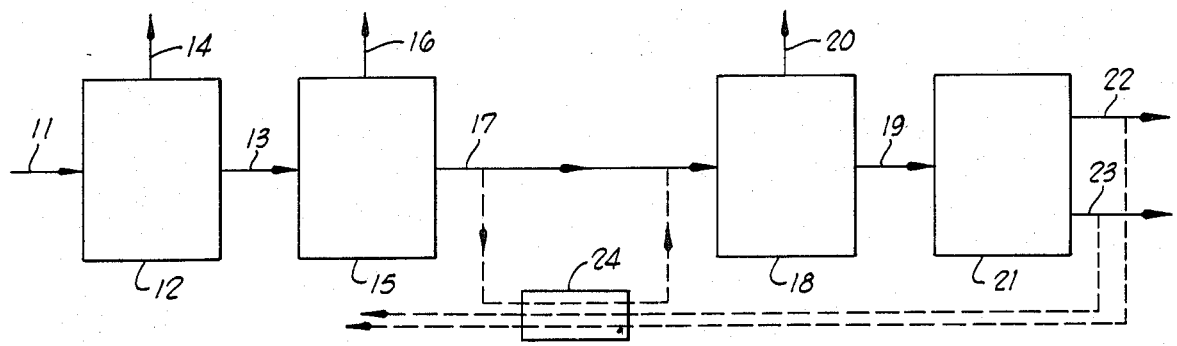
FIG. 1 is a schematic block flow diagram showing a method of producing isotopically enriched helium-4, starting with a natural gas helium source.

Referring to FIG. 1, a natural gas helium source is fed via a line designated by general reference numeral 11 to helium extraction unit 12, wherein a portion of the helium content of the natural gas is removed as crude helium, which leaves via line 13. Helium-denuded gas leaves helium extraction unit 12 via line 14. The helium extraction unit can be any one of a number of designs, the preferred one being a low-temperature or cryogenic one, in which the non-helium components are preferentially liquefied by cooling and then separated. Another method of producing crude helium in helium extraction unit 12 is by gas permeation through membranes, in which the helium, being the lightest component, tends to diffuse preferentially through a semi-permeable gas membrane or barrier, whereby it is separated from the non-helium components of the gas.

Crude helium in line 13 contains helium predominantly, with lesser amounts of other gases, primarily nitrogen and neon, but also some hydrocarbons and hydrogen. It is passed to helium purification unit 15 in which, generally by a cryogenic process of liquefying and separating the remainder of the non-helium components and adsorbing the residual impurities onto charcoal, or molecular sieve, or both, operated at low temperatures, the non-helium components and residual impurities are removed via line 16 to yield natural gas source helium, which leaves helium purification unit 15 via line 17. The impurities in natural gas source helium are reduced to such a level that subsequent liquefaction of said helium can readily take place, and comprise primarily nitrogen, but with some neon and occasionally trace amounts of hydrogen, water vapor and carbon dioxide.

Natural gas source helium is useful in the trade, possessing a range of purities from 99.995 vol. percent ("Grade A") through 99.997 percent ("High Purity") to about 99.999 percent ("Reactor Grade"), depending upon the application to which it is put. It can be made in any one of these purities by proper adjustment of the operating conditions in helium purification unit 15.

Natural gas source helium in line 17 ordinarily leaves helium purification unit 15 at a temperature near ambient and at a pressure of about 25–30 atm, but it can leave unit 15 at a low temperature, in the neighborhood of 80° K., to preserve the refrigeration imparted to it in unit 15 and needed in the subsequent liquefaction step.

Natural gas source helium in line 17 is passed to helium liquefaction unit 18 wherein the temperature of the helium is reduced to the neighborhood of 4°–5° K. and the pressure reduced to about one atmosphere to produce liquefied natural gas source helium which leaves via line 19. There is rejected in helium liquefaction unit 18 those trace quantities of impurities present in the natural gas source helium feed to unit 18; these impurities are removed in small low temperature adsorbers contained within unit 18, and leave via line 20. The purity of the liquefied natural gas source helium in line 19 is in excess of 99.999 vol. percent; it is generally 99.9999 percent, that is, it possesses an impurity level of only about 1 ppm, the impurities being limited to the non-helium components which are still soluble in the liquefied natural gas source helium at a temperature of 4°–5° K.

Liquefied natural gas source helium in line 19 is the stream from which isotopically enriched helium-4 is produced. It is passed to helium-3 removal unit 21 from which there leaves isotopically enriched helium-4 via line 22, generally as saturated liquid, and isotopically denuded helium-4 (helium-4, the helium-3 content of which is above its level in natural gas source helium) via line 23, generally as saturated vapor.

Since isotopically enriched helium-4 in line 22 and isotopically denuded helium-4 in line 23 each possesses a considerable amount of refrigeration relative to gaseous helium at ambient temperature, under which condition they would generally be used, this valuable refrigeration can beneficially be recovered to provide thereby a reduction in the cost of helium liquefaction in helium liquefaction unit 18 by heat exchanging in heat exchanger 24 these streams in lines 22 and 23 against the natural gas source helium stream in line 17 preparatory to its entrance into helium liquefaction unit 18, as shown by the dotted lines of FIG. 1.

Helium-3 removal unit 21 operates at a minimum temperature of about 2.2° K. and a maximum temperature of about 5.1° K., just below the critical temperature of helium-4 of 5.2° K. The operating pressure corresponds to the saturation or equilibrium pressure of the system at operating temperature, and ranges accordingly from a minimum of about 40 mm (0.06 atm) to a maximum of about 1700 mm (2.25 atm). Preferably, helium-3 removal unit 21 operates at a temperature between about 2.3° K. and about 5.0° K., the corresponding saturation pressure being, respectively, about 55 mm (0.07 atm) and about 1500 mm (2.0 atm). The actual pressure (and corresponding temperature) condition selected for operation in the preferred range is based primarily on economics, a lower pressure (and temperature) providing greater separating power (fewer stages of separation) but requiring larger size equipment and higher operating costs, and a higher pressure characterized by more required stages of separation but providing smaller and simpler equipment and generally lower overall operating costs.

Figure 2:
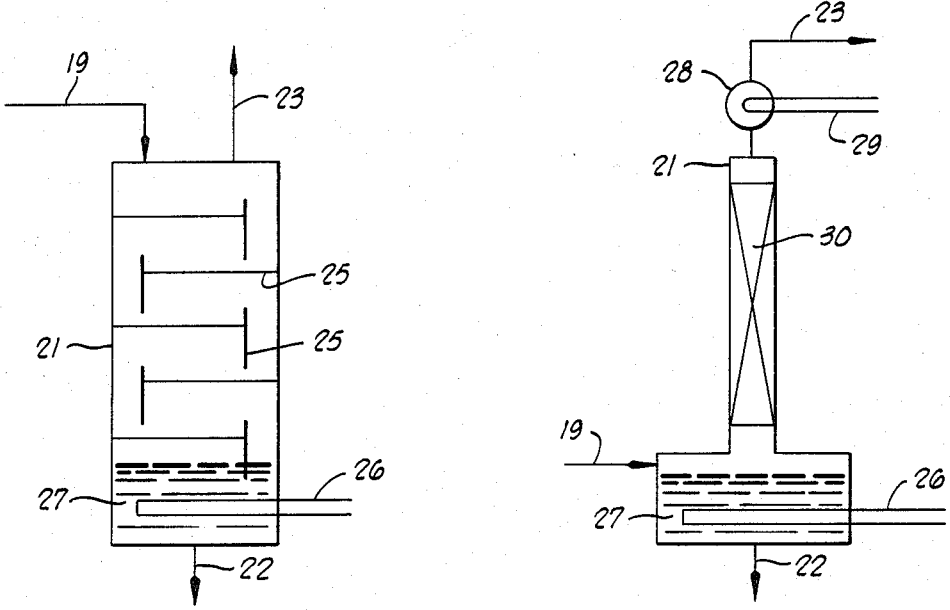
FIG. 2 is a more detailed diagrammatic representation of the helium-3 removal unit of FIG. 1, operated on a continuous basis.

FIG. 2 shows in greater detail one embodiment of helium-3 removal unit 21, in the form of a stripping column. The stripping column contains within it a plurality of contacting stages or trays, 25, which may be of any material suitable for low temperature operation, and in any form which provides intimate vapor-liquid contact. Feed comprising liquefied natural gas source helium enters the top of stripping column 21 via line 19. Liquid flows down the column from tray to tray, to be met by an upwardly flowing stream of vapor, generated by introducing a controlled amount of heat via heater 26 into liquid helium pool 27 at the bottom of the column. The rising vapor preferentially removes from the downflowing liquid its helium-3 content, so that the liquid leaving the bottom of the stripping column via line 22 is isotopically enriched helium-4 and the vapor stream leaving the top of the column via line 23 is isotopically denuded helium-4.

Figure 3:
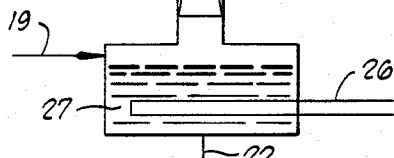
FIG. 3 is another more detailed diagrammatic representation of the helium-3 removal unit of FIG. 1, operated on a batch basis.

FIG. 3 shows another embodiment of helium-3 removal unit 21, to produce isotopically enriched helium-4 from liquefied natural gas source helium, the process being conducted on a batch rather than on a continuous basis. Liquefied natural gas source helium is charged via line 19 to the bottom of helium-3 removal unit 21, which is in the form of a still, the still column containing packaging 30 to provide extended vapor-liquid contacting surface. Vapor is generated out of the body of liquid 27 in the bottom of the still through the introduction of heat via heater 26. The vapor rises through column packing 30, passes to condenser 28, wherein a portion of the vapor is condensed to provide liquid reflux, which flows back down the column over the packing, the uncondensed portion of the vapor leaving via line 23. The condensing agent is any refrigerant, generally liquefied natural gas source helium at reduced pressure, which has a temperature below the condensing temperature of the vapor from the still, and which refrigerant enters the condenser via line 29. After a given amount of charge has been removed via line 23 as isotopically denuded helium-4, the remaining liquid in the still is withdrawn via line 22 as isotopically enriched helium-4.

The process of removing helium-3 from liquefied natural gas source helium to produce isotopically enriched helium-4 is further illustrated by the following examples.

EXAMPLE 1

Natural gas containing 8 vol. percent helium, 90 percent nitrogen, 1 percent carbon dioxide and 1 percent argon is processed for helium extraction and purification to give natural gas source helium of 99.999 vol. percent purity, the impurities being about 7 ppm of neon, 2 ppm of nitrogen and 1 ppm of water. This stream is heat exchanged and liquefied in a heat exchanger and a helium liquefaction unit, of the kind depicted by numerals 24 and 18, respectively, of FIG. 1. During liquefaction further purification of the helium takes place, and the liquefied natural gas source helium, of 99.9999 vol. percent purity and containing 0.21 ppm of helium-3, is passed via line 19 at the rate of three gallons per minute to a helium-3 removal unit, in the form of a stripping column of the kind depicted by numeral 21 of FIG. 2. Stripping column 21 has a diameter of 6 inches and a height of 10 feet. It contains 20 stainless steel sieve trays on 6 inch spacing, each tray perforated with a multiplicity of ⅜ inch diameter holes to give 14 percent of the total column cross-section as open tray area. Each tray is equipped with a downcomer which has an effective open area of 20 percent of the column cross-section. The column is equipped at the bottom with a 750 watt electric heater, reference numeral 26. The column is operated under a variety of pressure-temperature conditions and with different heat inputs into heater 26, to generate different splits of feed into isotopically denuded helium-4 vapor exiting via line 23, and isotopically enriched helium-4 liquid exiting via line 22, the exiting streams having the compositions as shown below in Table I.

TABLE I

| Pressure | | | Fraction | Helium-3 Concentration | | Heat |
| mm Hg | atm | Temperature | Stripped | Isotopically Enriched Helium-4 | Isotopically Denuded Helium-4 | Input |
| --- | --- | --- | --- | --- | --- | --- |
| 80 | 0.11 | 2.5° K. | 0.35 | <0.01 ppm | 0.58 ppm | 200 watts |
| 180 | 0.24 | 3.0 | 0.50 | <0.01 | 0.41 | 270 |
| 760 | 1.00 | 4.2 | 0.50 | 0.05 | 0.37 | 270 |
| 950 | 1.25 | 4.5 | 0.70 | 0.04 | 0.28 | 425 |
| 1400 | 1.84 | 5.0 | 0.90 | 0.12 | 0.22 | 550 |

EXAMPLE 2

One thousand three hundred fifty (1,350) standard cc. of natural gas source helium containing 0.21 ppm of helium-3 is liquefied to produce approximately 50 liters of liquid helium, which is then charged to a batch still, of the kind shown by reference numeral 21 of FIG. 3. The still column is of stainless steel, 1 inch in internal diameter and packed with a 30 inch height of stainless steel helices. The still is equipped with an overhead helium condenser, using liquefied natural gas source helium at reduced pressure to provide a refrigerant temperature below that of the condensing vapor in the column.

The still is equipped at the bottom with a 5 watt heater. It is operated at full heater input at a pressure in the vicinity of 0.5 atm, with control of the pressure through regulation of the amount of refrigerant permitted into the condenser, and with a constant volume of 60 standard cubic feet of overhead product withdrawn per hour, thus operating at a constant reflux ratio of about 1.8.

The distillation is continued until the amount of liquid remaining in the bottom of the still is 60.5 percent of the original, at which time the concentration of helium-3 found therein is 0.13 ppm. The composite gas withdrawn overhead has a helium-3 concentration of 0.34 ppm.

The distillation is further continued under the same conditions until the liquid in the bottom of the still has been reduced to 45.2 percent of the original amount. It is found that the helium-3 content of the liquid residue is 0.09 ppm, and that the composite gas withdrawn overhead from the beginning of the distillation has 0.30 ppm of helium-3.

The distillation is still further continued under the same conditions until the liquid in the bottom of the still has been reduced to 30.2 percent of the original amount. It is found that the helium-3 content of the liquid residue is 0.06 ppm, and that the composite gas withdrawn overhead from the beginning of the distillation to the end has a helium-3 content of 0.27 ppm.

Figure 4:
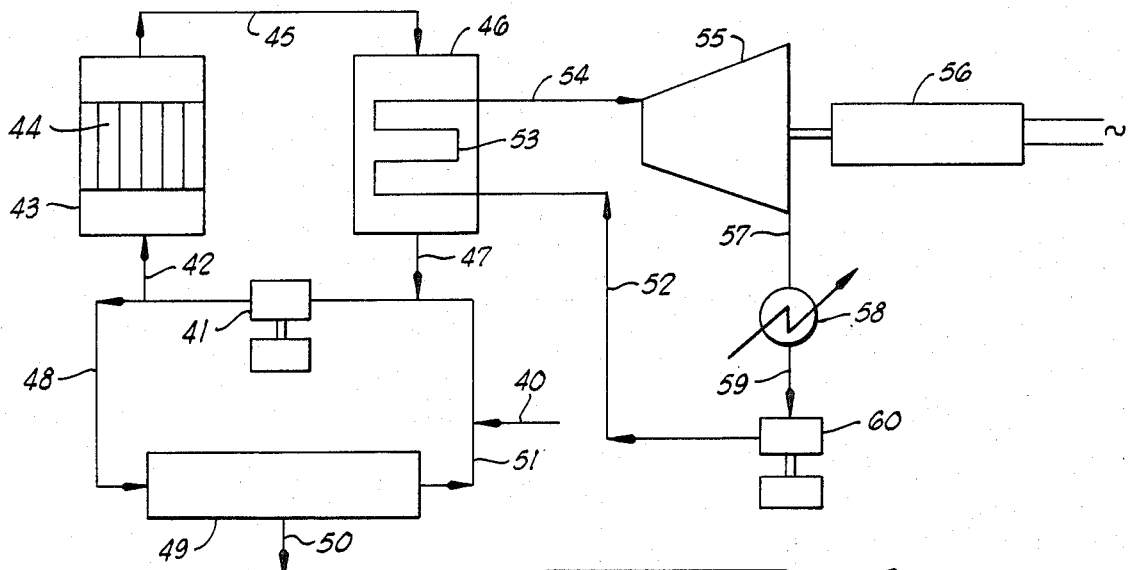
FIG. 4 is a schematic block diagram showing a method of cooling a high-temperature gas-cooled nuclear reactor with isotopically enriched helium-4.

Referring now to FIG. 4, helium coolant gas is introduced into the high-temperature gas-cooled nuclear reactor coolant system through line 40, to fill the system and to make up subsequent operations losses. During operation, helium circulant at a temperature of about 760° F. and a pressure of 700 psig is picked up by helium circulator 41 and delivered via line 42 into nuclear reactor 43 containing core 44. Upon passing through core 44, the circulant picks up nuclear heat and leaves reactor 43 through line 45 at a temperature of 1430° F. It is routed to steam generator 46 wherein it is cooled from 1430° F. back to 760° F. and from which it leaves via line 47. A portion of the circulating helium stream is withdrawn from the discharge side of helium circulator 41 via line 48 to enter purification system 49 wherein impurities, including radioactive ones such as tritium, are removed via line 50. Purified helium leaves purification system 49 via line 51 to reenter the main circulating loop at the suction side of circulator 41. Feed water enters steam generator 46 via line 52, is heated, vaporized and superheated in steam coil 53 and leaves generator 46 via line 54 at a temperature of 1000° F. and a pressure of 2400 psig. The steam enters turbine 55 in which it carries out work, driving generator 45. Exhaust steam leaving turbine 55 via line 57 is condensed in condenser 58 to water. Condensate leaves condenser 58 via line 59 to enter feedwater pump 60, by which it is discharged into line 52 to repeat the cycle.

When natural gas source helium is the coolant, the volume of tritium and hydrogen formed in the cooling system per year and removed therefrom in the purification system is about 0.5 percent of the helium inventory volume. The tritium volume is only on the order of 0.01 percent of this, but the tritium is strongly radioactive; hydrogen is not. Upon substitution of isotopically enriched helium-4 for natural gas source helium as the coolant, the radioactivity level of the coolant is reduced in proportion to the reduction in helium-3 concentration of the coolant brought about by the substitution, and the frequency with which the tritium-hydrogen impurity removal beds need to be disposed of is reduced accordingly. The hydrogen content of the coolant increases in proportion because of lesser amounts removed through purification, and is in the vicinity of 3.0 percent by volume when the isotopically enriched helium-4 contains about 0.10 ppm of helium-3.

When the isotopically enriched helium-4 contains less than about 0.01 ppm of helium-3, the reduction in tritium radioactivity level in the coolant is sufficient to require no removal whatever of tritium from the coolant, permitting thereby the complete elimination of the tritium-hydrogen purification system. Under these operating conditions, the hydrogen in the coolant builds up to levels of several volume percent, improving significantly the heat transfer properties of the coolant and lowering the costs of coolant circulation. Optimization of the level of hydrogen in the coolant is made by one or more of the following means: adjustment of operating conditions of the coolant circuit, degree of separate removal of hydrogen and of tritium in a purification bed, and introduction of hydrogen from an external source. Preferably, the level of hydrogen in the coolant is maintained between about 1 percent and 5 percent by volume, and is not permitted to exceed about 6 percent by volume, the maximum non-flammable concentration upon admixture with air.

The foregoing detailed description and the drawings are for the purposes of illustration only, and are not intended to be limiting to the spirit or scope of the appended claims.

I claim:

1. A method of producing isotopically enriched helium-4 which comprises providing a helium feed stock recovered from natural gas, liquefying said feedstock and removing by distillation helium-3 from said liquefied feedstock.

2. The method of claim 1, wherein the removal of helium-3 is accomplished at a temperature between about 2.2° K. and about 5.1° K., and at a pressure equal to the equilibrium pressure of the system.

3. The method of claim 1, wherein the removal of helium-3 is accomplished at a temperature between about 2.3° K. and about 5.0° K., and at a pressure equal to the equilibrium pressure of the system.

4. A method for producing isotopically enriched helium-4 which comprises:
   providing a helium feedstock recovered from natural gas;
   liquefying said feedstock;
   separating by distillation the liquefied feedstock into at least an isotopically enriched helium-4 fraction and an isotopically denuded helium-4 fraction; and
   passing in heat exchange relation with the liquefied feedstock at least one of said fractions, to recover the refrigeration contained in said one fraction.

5. A process for cooling a high-temperature gas-cooled nuclear reactor with enhanced safety and efficiency comprising:
   providing a helium feedstock recovered from natural gas;
   liquefying said feedstock;
   separating by distillation the liquefied feedstock into at least an isotopically enriched helium-4 fraction and an isotopically denuded helium-4 fraction;
   passing in heat exchange relation with the liquefied feedstock at least one of said fractions to recover the refrigeration contained in said one fraction;
   circulating in said reactor as the coolant, said isotopically enriched helium-4 fraction; and
   maintaining a concentration of hydrogen gas in said circulating coolant of from about 1 volume percent to about 6 volume percent.

6. The method comprising: providing a helium feedstock recovered from natural gas, liquefying said feedstock, and producing isotopically enriched helium-4 directly from liquefied feedstock by removal of helium-3 therefrom by distillation.

* * * * *

UNITED STATES PATENT AND TRADEMARK OFFICE
CERTIFICATE OF CORRECTION

PATENT NO. : 4,525,186

DATED : June 25, 1985

INVENTOR(S) : Leo Garwin

It is certified that error appears in the above-identified patent and that said Letters Patent are hereby corrected as shown below:

In the first column on the front (title) page of the patent, between "Inventor:" and "Notice:" insert --Assignee: Southwest Services, Inc., Oklahoma City, Oklahoma--.

In column 11, line 7 (Claim 1) after the word "a", delete the words --helium feed stock-- and insert --feedstock consisting essentially of a mixture of helium isotopes and--. Column 11, line 21 (Claim 4) after the word "a", delete the word --helium-- and after the word "feedstock" insert the words --consisting essentially of a mixture of helium isotopes and--. Column 12, line 1 (Claim 4) after the words "exchange relation with the" delete the word --liquefied---. Column 12, line 7 (Claim 5) after the words "providing a" delete the word --helium-- and after the word "feedstock" insert the words --consisting essentially of a mixture of helium isotopes and--. Column 12, line 14 (Claim 5) before the word "feedstock" delete the word --liquefied--. Column 12, line 21 (Claim 6) after the words "providing a" delete the word --helium-- and insert the words --consisting essentially of a mixture of helium isotopes and--. Column 12, line 24 (Claim 6) after the words "directly from" insert the word --said--.

Signed and Sealed this

Eleventh Day of February 1986

[SEAL]

Attest:

Attesting Officer

DONALD J. QUIGG

Commissioner of Patents and Trademarks